(12) United States Patent  
Mikan

(10) Patent No.: US 7,499,032 B1  
(45) Date of Patent: Mar. 3, 2009

(54) KEYPAD COMPUTER MOUSE EMULATION SYSTEM

(76) Inventor: Peter J. Mikan, 31 Greenfield Rd., Milford, CT (US) 06460

( * ) Notice: Subject to any disclaimer, the term of this patent is extended or adjusted under 35 U.S.C. 154(b) by 628 days.

(21) Appl. No.: 11/108,112

(22) Filed: Apr. 18, 2005

Related U.S. Application Data

(63) Continuation-in-part of application No. 10/051,810, filed on Jan. 18, 2002, now abandoned.

(51) Int. Cl.
*G09G 5/00* (2006.01)

(52) U.S. Cl. ............... 345/172; 345/156; 345/157; 345/163; 345/168; 345/173

(58) Field of Classification Search .......... 345/156–178
See application file for complete search history.

(56) References Cited

U.S. PATENT DOCUMENTS

| | | | | |
|---|---|---|---|---|
| 4,650,934 A | * | 3/1987 | Burke | 200/5 R |
| 5,049,863 A | * | 9/1991 | Oka | 345/163 |
| 5,063,376 A | * | 11/1991 | Chang | 345/163 |
| 6,014,131 A | * | 1/2000 | Barry et al. | 345/172 |
| 6,100,875 A | * | 8/2000 | Goodman et al. | 345/163 |
| 6,445,381 B1 | * | 9/2002 | Chou | 345/168 |
| 6,492,978 B1 | * | 12/2002 | Selig et al. | 345/173 |
| 2002/0015609 A1 | * | 2/2002 | Webber | 400/489 |
| 2002/0198947 A1 | * | 12/2002 | Sesek | 709/206 |

* cited by examiner

*Primary Examiner*—Bipin Shalwala  
*Assistant Examiner*—Vince E Kovalick  
(74) *Attorney, Agent, or Firm*—Our Pal LLC; Pal Asija

(57) ABSTRACT

A keypad of six keys connected to a circuit that includes a microprocessor and interface driver connected to cable which plugs directly into a computer mouse port. The keypad has four arrow keys, which allow for cursor control in eight directions, and two other keys, which provide the left and right mouse button functions. The keypad is made of molded silicone rubber, is waterproof, and has translucent key legends which allow for back-lighting, that is provided by six LED's that are controlled by the microprocessor allowing the light intensity to be adjusted by the user.

1 Claim, 7 Drawing Sheets

Figure 1:
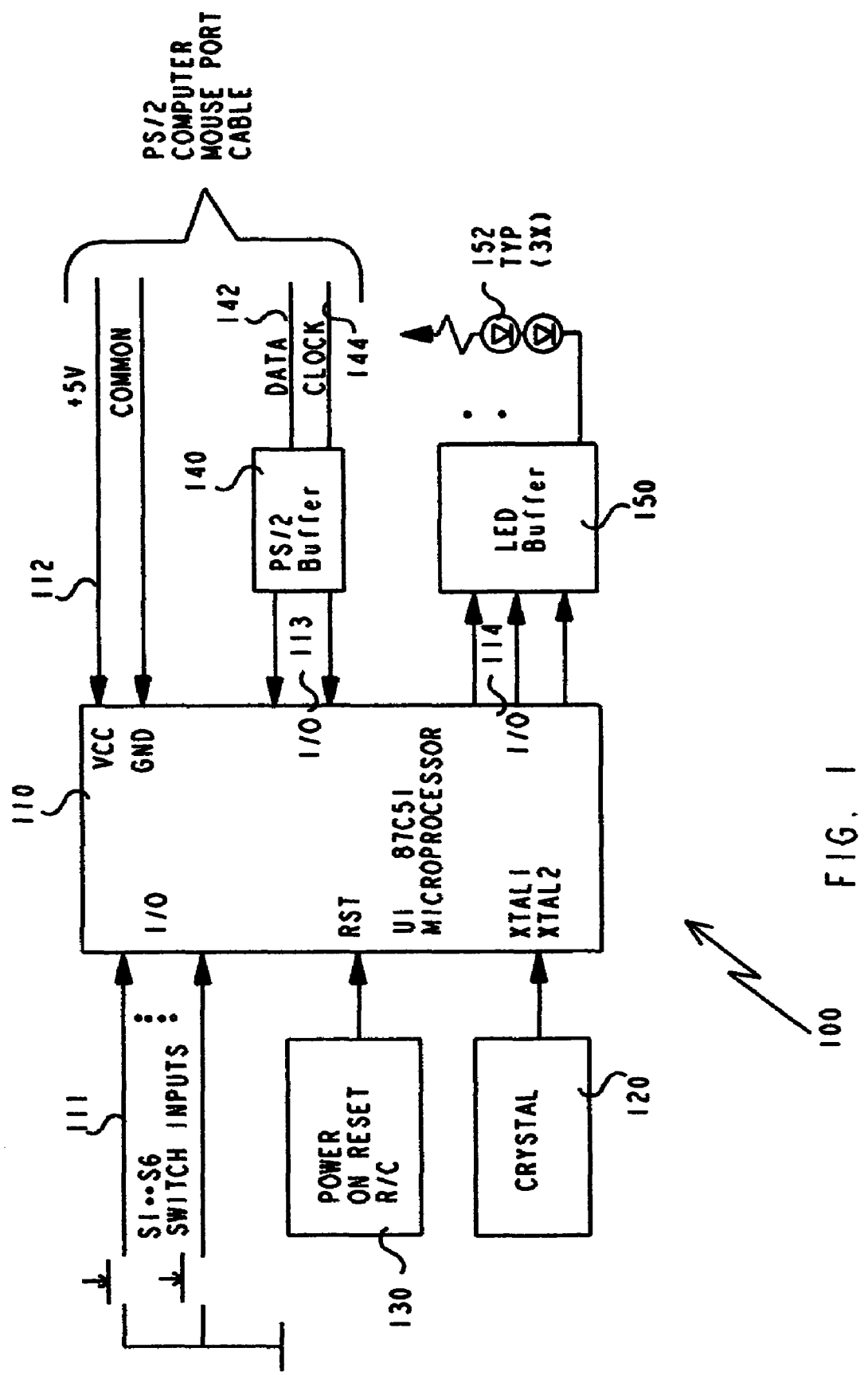

640 = KEYS  
630 = MOUSE BUTTON FUNCTIONS

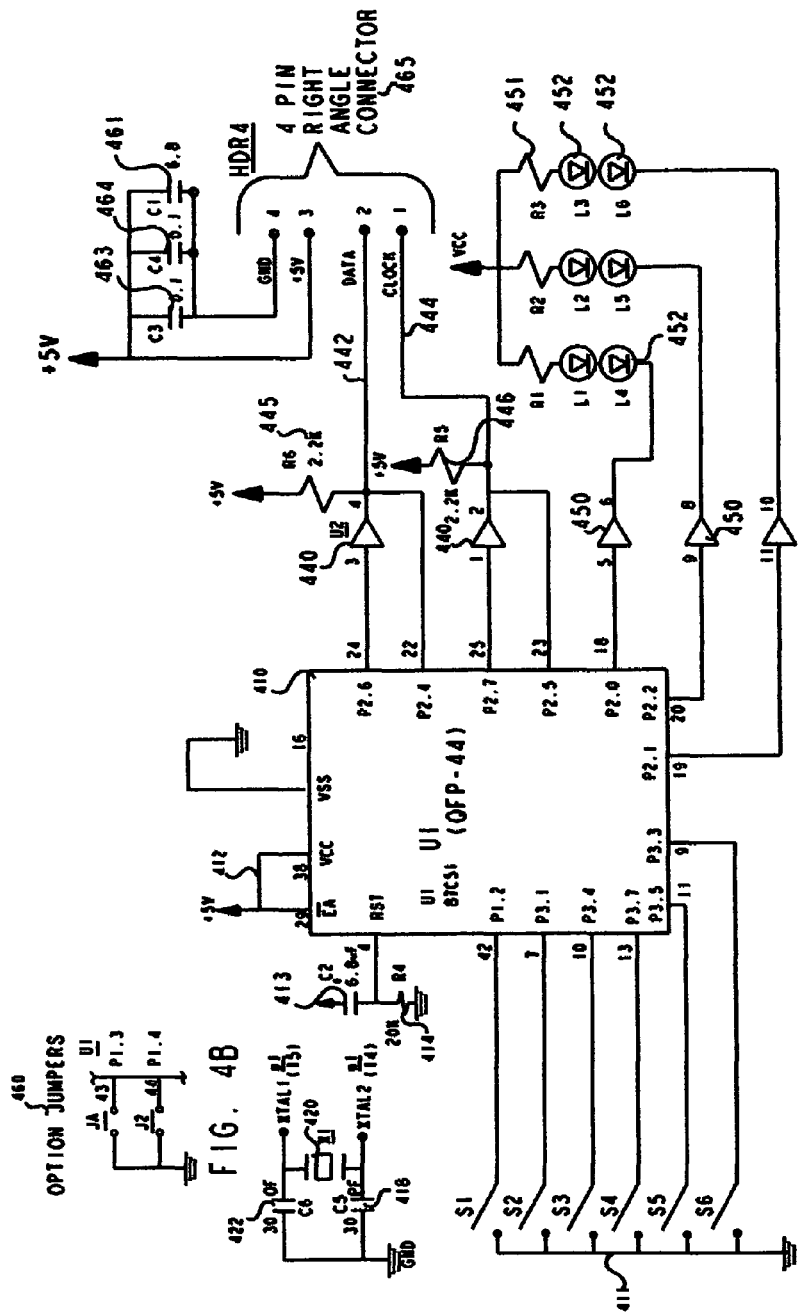
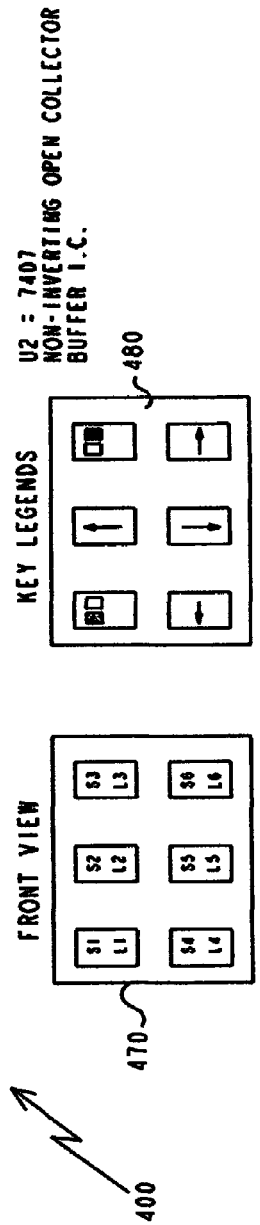
FIG. 4A
FIG. 4B
FIG. 4C
FIG. 4D

640 = KEYS
630 = MOUSE BUTTON FUNCTIONS

KEYPAD COMPUTER MOUSE EMULATION SYSTEM

RELATED DOCUMENT

This application is a Continuation-In-Part Application to Ser. No. 10/051,810 filed Jan. 18, 2002 now abandoned filed by the same inventor bearing the same title, "Keypad Computer Mouse Emulation System" which in turn is tangentially related to Non-Provisional application Ser. No. 09/547,946 filed Apr. 12, 2000 titled, "Mouse Emulation Keyboard System" by the same inventor which claimed priority from provisional application No. 60/129,018 filed Apr. 13, 1999 by the same inventor bearing the same title. This application is also related to a design patent application entitled Industrial Mouse Keypad Ser. No. 29/133,804 filed Dec. 8, 2000 by the same inventor.

BACKGROUND

This invention relates generally to computer keyboards. More particularly it relates to a keypad for emulating a computer mouse such that it fools the user into believing that a mouse is interfaced to the computer when in fact it is a keypad transparently emulating the functions of a conventional mouse and is plugged into the conventional computer mouse port.

The Problem

The problem with prior art mouse or other pointing device integrated dual function keyboards is that they simulate the mouse function on the keyboard by using the keyboard port. Some other prior are devices simulate the mouse function on the keyboard by software alone without any hardware emulation. All of the prior art systems by software simulation or integrated hardware utilize the same keyboard port. Separate devices are not practical at shop/factory floors.

Simulated devices are not functionally transparent to the computer because they are interfaced via the keyboard port only. Another problem with prior art that they are not suitable for use on factory floor or other environment where liquids may be present and interfere with the proper functioning of the devices. Furthermore they are not user and computer transparent. This invention solves these problems in a simple, aesthetic and elegant manner. The problems with prior art computer mouse keyboard peripherals can be categorized into the following:
1. Not suitable for industrial use.
2. Not user transparent
3. Not computer transparent to the mouse port.
4. Require special keyboard controller with specialized firmware or prior art devices require specialized software.

SUMMARY

This invention comprises a keypad of six keys connected to a circuit that includes a microprocessor and interface driver connected to cable which plugs directly into a computer mouse port. The keypad has four arrow keys, which allow for cursor control in eight directions, and two other keys, which provide the left and right mouse button functions. The keypad is made of molded silicone rubber, is waterproof, and has translucent key legends which allow for back-lighting, that is provided by six LED's that are controlled by the microprocessor allowing the light intensity to be adjusted by the user. This is a very compact, sealed design, which allows for simple integration into various equipment found in industrial, medical and other applications. It plugs directly into a conventional (physical) mouse port of a host computer and thus uses the standard mouse driver software integrated in the Windows operating software. Additionally it requires no special or modified controller IC (keyboard or mouse) in the host computer hardware. This makes a true, stand-alone mouse type peripheral.

PRIOR ART

An informal preliminary prior art patentability and novelty search was conducted. Furthermore the inventor is intimately familiar with the prior art. Following are examples of the prior art discovered in the search and/or known to the applicant/inventor and/or his patent agent/attorney.

The following prior art United States patents have been arranged in the reverse chronological order for ready reference of the reader.

a) U.S. Utility Pat. No. 5,835,791 awarded to Goff et al on Nov. 10, 1998 for "Versatile Connection of a First Keyboard/Mouse Interface and a Second Keyboard/Mouse Interface to a Host Computer"

b) U.S. Utility Pat. No. 5,831,597 granted to West et al on Nov. 3, 1998 for "Computer Input Device for Use in Conjunction with Mouse Input Device"

c) U.S. Utility Pat. No. 5,621,436 bestowed upon Erik Solhjell of Norway on Apr. 15, 1997 for Keyboard with Integrated Mouse for Data Entry and Control"

d) U.S. Utility Pat. No. 5,608,895 earned by Kwanho Lee of Korea on Mar. 4, 1997 for "Method for Providing Mouse Functionality Using Either an Internal or External Mouse Input Device"

e) U.S. Utility Pat. No. 5,594,847 published in the name of Elizabeth Moursound on Jan. 14, 1997 for "System and Method for Selecting Free Form Objects Associated with a Selection Region Displayed by a Computer"

f) U.S. Utility Pat. No. 5,590,315 blessed upon Hess et al on Dec. 31, 1996 for "Method and Apparatus for Simulating User Input Device Presence in a Computer System"

g) U.S. Utility Pat. No. 5,577,848 bestowed upon James Bowen on Nov. 26, 1996 for "Light Controlled Touch Pad for Cursor and Selection Control on a Computer Display h) U.S. Utility Pat. No. 5,568,987 honorably given to Patrick Franz on Oct. 29, 1996 for "Pointing Stick in a Computer Keyboard for Cursor Control"

i) U.S. Utility Pat. No. 5,515,040 honorably presented to Lee et al on May 7, 1996 for "Method of Self-Calibration for a Key-Type Mouse"

j) U.S. Utility Pat. No. 5,407,285 patented by Patrick Franz on Apr. 18, 1985 for "Pointing Stick in a Computer Keyboard for Cursor Control"

k) U.S. Utility Pat. No. 5,376,946 awarded to Peter Mikan on Dec. 27, 1994 for "Computer Mouse Simulator Device"

l) U.S. Utility Pat. No. 5,305,449 bestowed upon Jonas Ulenas on Apr. 19, 1994 for "Keyboard/Pointing Device Conversion Adapter, which Converts Mouse Motion Signals into Cursor Signals by Activating Keyboard Cursor Keys"

m) U.S. Utility Pat. No. 5,198,802 honored upon Bertram et al on Mar. 30, 1993 for "Combined Keyboard and Mouse Entry"

n) U.S. Utility Pat. No. 5,189,403 earned by Franz et al on Feb. 23, 1993 for "Integrated Keyboard and Pointing Device System with Automatic Mode Change"

o) U.S. Utility Pat. No. 5,124,689 given to Franz et al on Jun. 23, 1992 for "Integrated Keyboard and Pointing Device System"

p) U.S. Utility Pat. No. 5,058,046 bestowed upon James Lapeyre on Oct. 15, 1991 for "Cursor Selected Keyboard Keys Displayed on the Computer Screen for Entering Alpha Numeric Characters and Instructions, particularly for Creating Computer Aided Design and Drafting Patterns"

q) U.S. Utility Pat. No. 5,049,863 presented to Mayumi Oka of Japan on Sep. 17, 1991 for "Cursor Key Unit for a Computer Having a Mouse Function Removeably Mounted on a Keyboard Section of a Base"

r) U.S. Utility Pat. No. 5,021,638 to Nopper et al on Jun. 4, 1991 for "keyboard Cover"

s) U.S. Utility Pat. No. 4,917,516 honorably bestowed upon Dale Retter on Apr. 17, 1990 for "Combined Computer Keyboard and Mouse Data Entry System"

t) U.S. Utility Pat. No. 4,882,581 blessed upon Inobe et al on Nov. 21, 1989 for "Keyboard for a Portable Data Terminal"

u) U.S. Utility Pat. No. 4,868,549 published in the names of Affinito et al on Sep. 19, 1989 for "Feedback Mouse"

v) U.S. Utility Pat. No. 4,775,574 earned by Fukushima et al of Japan on Oct. 4, 1988 for "Covering Member of a Keyboard and a Base Plate Therefor"

Additionally the following prior art was made of record by the examiner in the prosecution of the '810 application which is also arranged in reverse chronological order for ready reference of the reader.

10) U.S. Utility Pat. No. 6,614,364 B1 issued in September 2003 to Yeh, Chi-Pin

9) U.S. Utility Pat. No. 6,590,508 B1granted to Howell et all in July 2003

8) U.S. Utility Pat. No. 6,557,170 B1 granted to Wilder et al in April 2003.

7) U.S. Utility Pat. No. 6,492,978 B1 presented to Selig et al in December 2002

6) U.S. Utility Pat. No. 6,100,875 published in the names of Goodman et al in August 2000.

5) U.S. Utility Pat. No. 5,963,191 showered upon William Jaaskelainen, Jr., in Ocotber 1999.

4) U.S. Utility Pat. No. 5,818,361 awarded to Elkin Acevedo in October 1998.

3) U.S. Utility Pat. No. 5,711,588 granted to Charles A. Rudsill in January 1998

2) U.S. Utility Pat. No. 5,485,614 blessed upon Kocis et al in January 1996

1) U.S. Utility Pat. No. 4,491,692 printed in the name of Shan Lee in January 1985.

Unfortunately none of the prior art devices singly or even in combination provide all of the features and objectives established by the inventor for this system as enumerated below.

OBJECTIVES

1. It is an objective of this invention to provide methods, devices and system for user and computer transparent mouse emulation keypad, which plugs directly into the conventional mouse port of a computer and or keyboard.

2. Another objective of this invention is to provide aesthetic and elegant design that integrates harmoniously with the environment.

3. Another objective of this invention is to provide a mouse emulation keypad that is suitable for industrial use such as a factory floor or any rough office or home environment where there is risk of liquids such as coffee and other drinks spilling.

4. Another objective of this invention is to emulate the mouse function on the keyboard by hardware as contrasted from simulation by software.

5. Another objective of this invention is that it use little or no additional power or energy.

6. Another objective of this invention is that it is easy to use even intuitive that requires little additional training.

7. Another objective of this invention is that it be environmentally friendly.

8. Another objective of this invention is that it be made of modular units easily interface-able to each other.

9. Another objective of this invention is that it meets all federal, state, local and other private standards, guidelines and recommendations with respect to safety, environment, quality and energy consumption.

10. Another objective of this invention is that it be suitable for users of all ages, gender, cultures, nations and races etc.

11. Another objective of this invention is that it be elegantly simple in concept and design.

12. Another objective of this invention is that it be used by handicapped as well as people who are not professional typists.

13. Another objective of this invention is that it be easy to assemble, service, transport and store.

14. Another objective of this invention is that it be useable in all types of locations including home, schools, work, office, shop floor, factory floor etc.

15. Another objective of this invention is that it can be used without removing the gloves in cold environment without any degradation in speed, quality or performance.

16. Another objective of this invention is that the keypad and the underlying concept can be adapted for other uses.

17. Another objective of this invention is that it be ergonomic, colorful and aesthetic.

18. Another objective of this invention is that the device of this invention be mouse port plug compatible with the electronic digital computers of the prior art.

19. Another objective of this invention is that the mouse keypad of this invention has normal touch and feel with tactile feedback on the keys.

20. Anther objective of this invention is that it be user friendly and computer transparent.

21. Another objective of this invention is that the arrow keys of the keypad can be used to emulate the pointing function at any vector at any speed including precise adjustment pixel by pixel.

22. Another objective of this invention is that the mouse mode key be backlit such that its status is constantly and instantly known to the operator at all times.

23. Another objective of this invention is that it lends itself to multiple uses.

24. Another objective of this invention is that it be reliable such that it practically never fails and requires little or no maintenance.

25. Another objective of this invention is that it be made from biodegrade materials to the extent practical.

26. Another objective of this invention is that it be long lasting made from durable material.

27. Another objective of this invention is that it be suitable for both OEM as well as retrofit markets.

28. Another objective of this invention is that it be suitable for gift giving and for promotional give aways complete with message of the sponsor such as a casino or church.

29. Another objective of this invention is that it plugs directly into a conventional (physical) mouse port of a host computer and thus uses the standard mouse driver software integrated in the Windows operating software.

30. Other objectives of this invention reside in its simplicity, elegance of design, ease of manufacture, service and use and even aesthetics as will become apparent from the following brief description of the drawings and the detailed description of the concept embodiment.

Figure 2A:
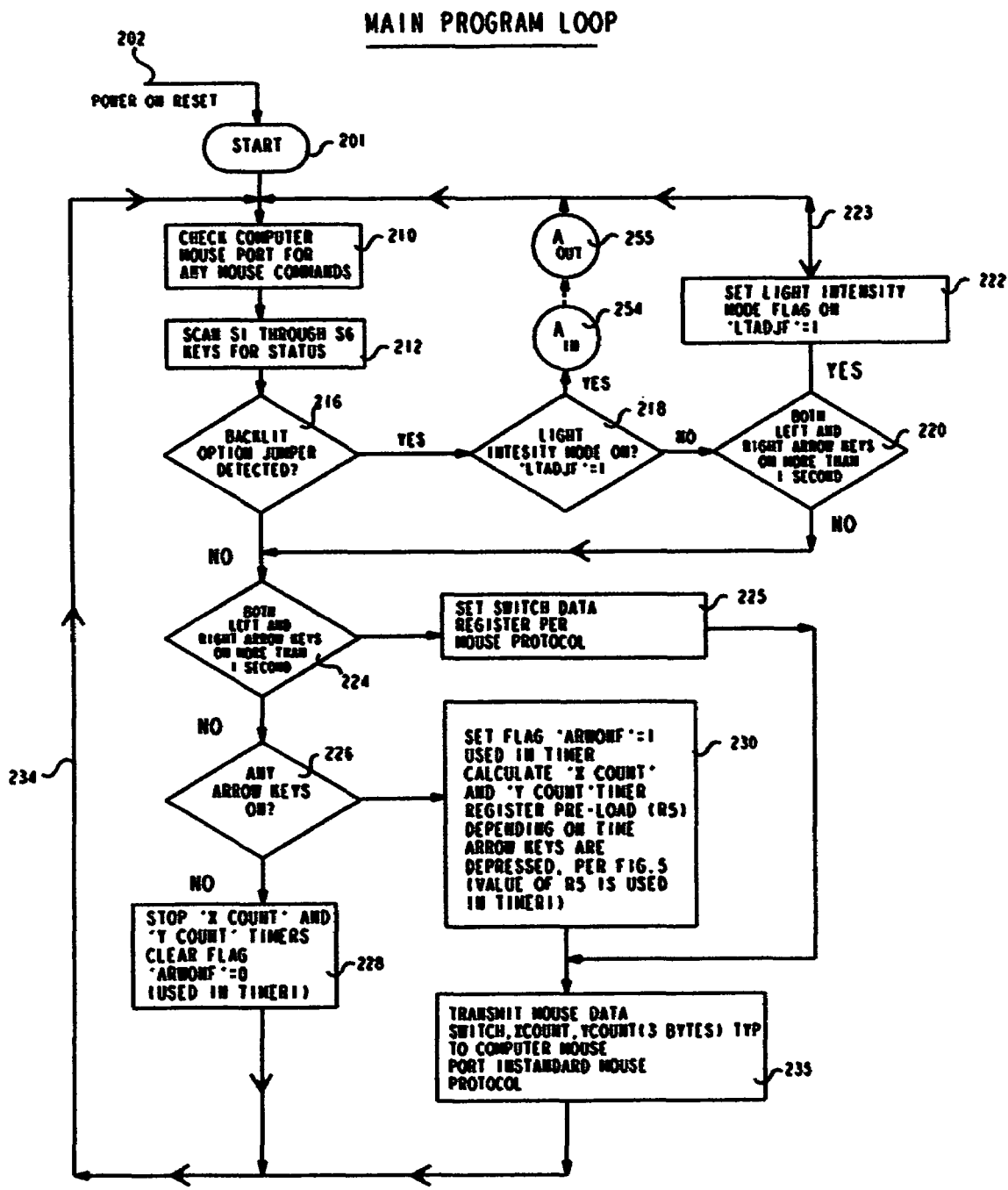
Figure 2B:
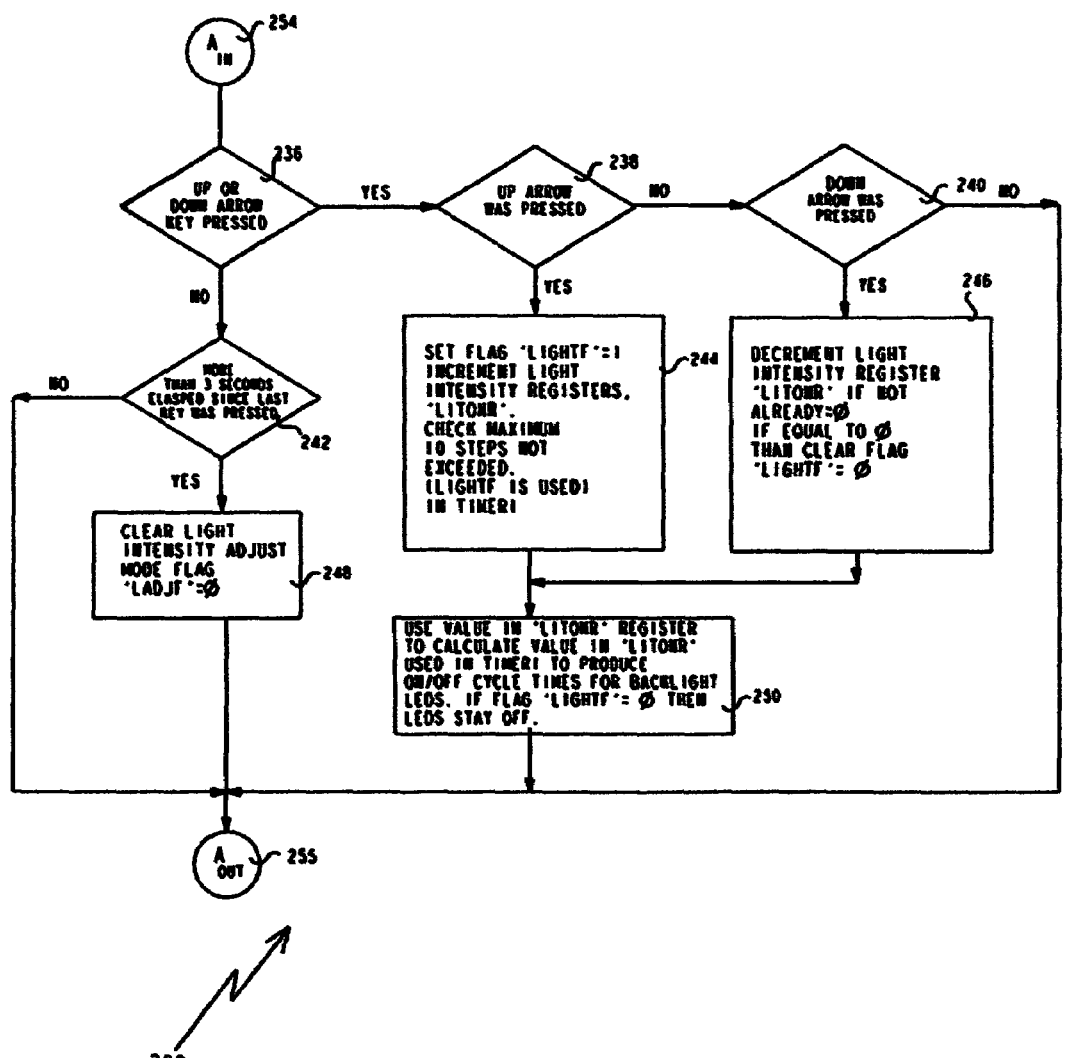
Figure 3:
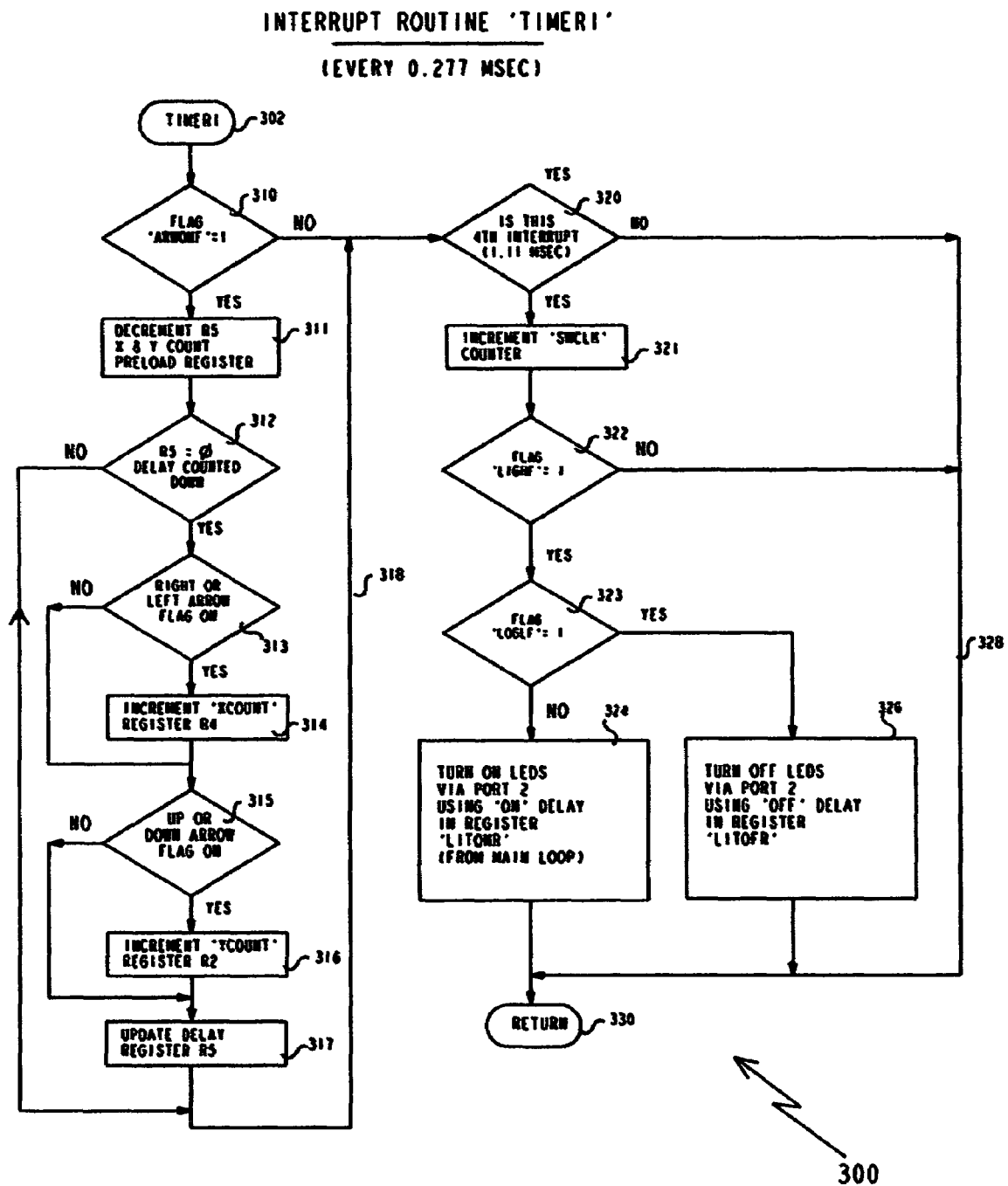
Figure 5:
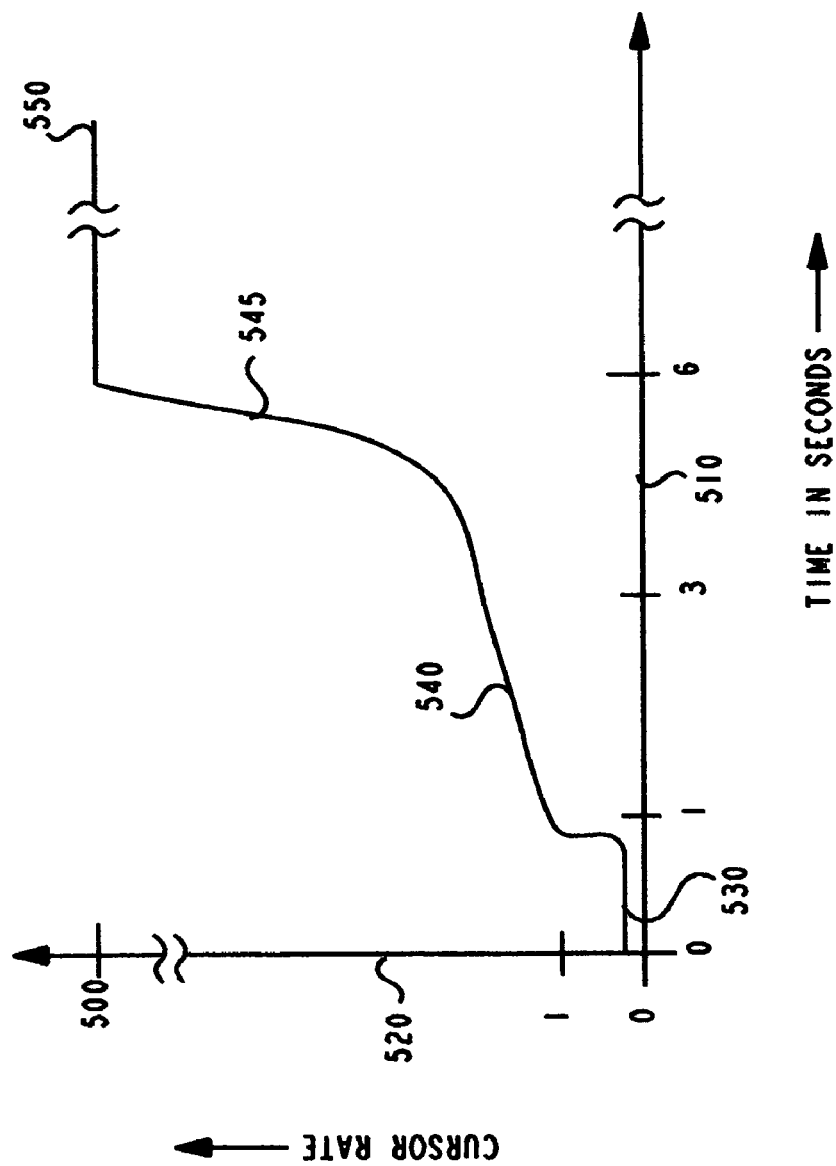
Figure 6:
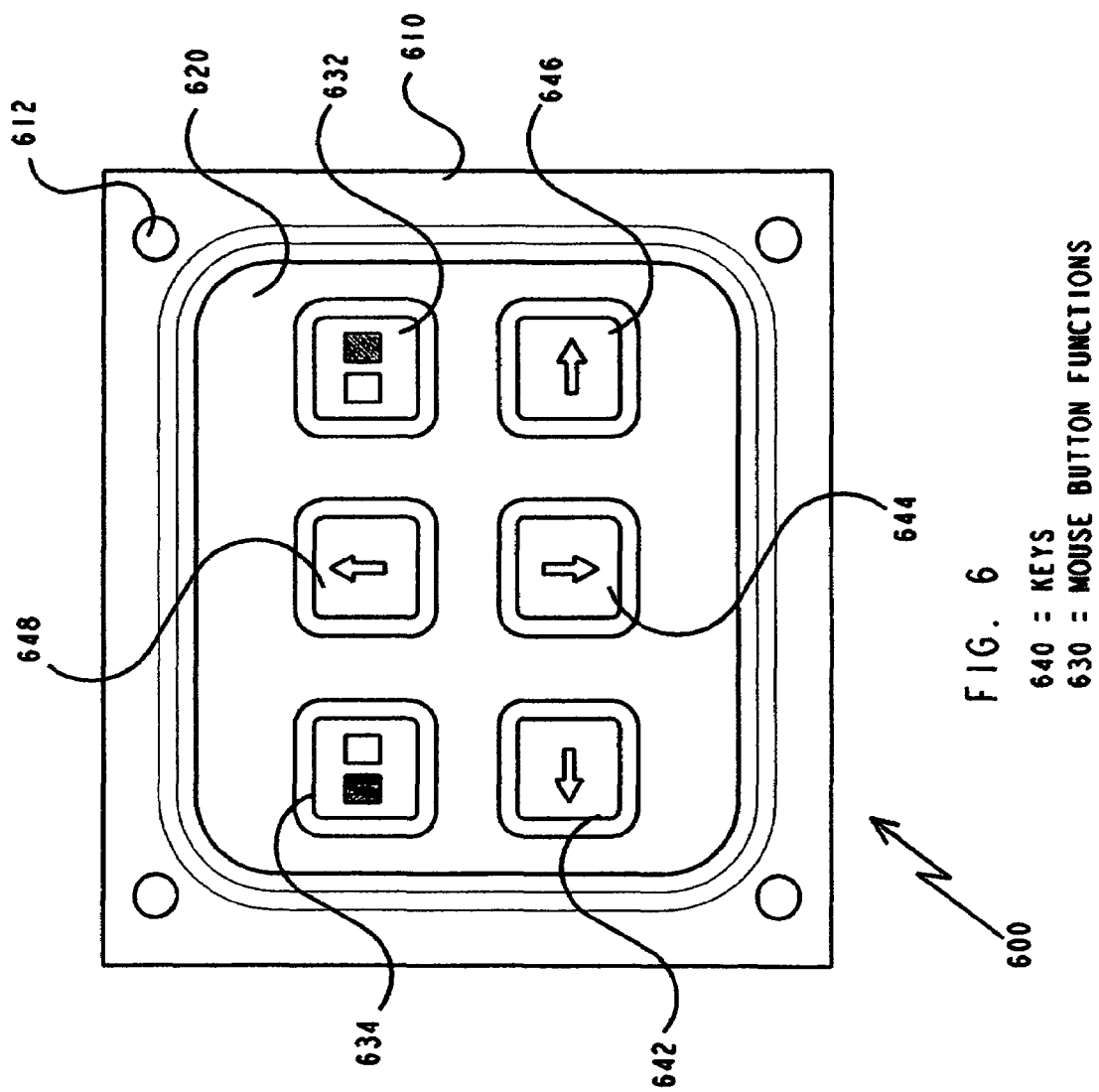

BRIEF DESCRIPTION OF THE DRAWINGS a) FIG. 1 is a block diagram of the mouse emulation keypad system of this invention.

b) FIG. 2 is a flow chart of the main computer program and comprises two sheets divided into FIGS. 2-A and 2-B respectively.

c) FIG. 3 is flow chart of the interrupt routine interfaced to the main computer program and operating under the control of said main computer program.

d) FIG. 4 is a circuit diagram of the mouse emulation keypad and comprises FIGS. 4A through 4-D on a single sheet.

e) FIG. 5 is a graph of cursor rate along Y-axis against arrow key depressed time along x-axis.

f) FIG. 6 is a typical layout of the six-backlit keys of the keypad of this invention.

DETAILED DESCRIPTION OF THE BEST MODE PREFERRED EMBODIMENT

The mouse emulation keypad of this invention as shown in the drawings wherein like numerals represent like parts throughout the several views, there is generally disclosed in FIG. 1 is a block diagram of the mouse emulation keypad system of this invention and FIG. 2 is a flow chart of the main computer program and comprises two sheets divided into FIGS. 2-A and 2-B respectively and FIG. 3 is flow chart of the interrupt routine interfaced to the main computer program and operating under the control of said main computer program and FIG. 4 is a circuit diagram of the mouse emulation keypad and comprises FIGS. 4A through 4-D on a single sheet, and FIG. 5 is a graph of cursor rate along Y axis against arrow key depressed time along x axis and FIG. 6 is a suggested layout arrangement of the 6 keys of the keypad all of which are further delineated below with reference numerals integrated into the drawings.

DISCUSSION OF THE PRIOR ART

The keypad computer mouse emulation system of this invention is a self-contained mouse emulator in that it plugs directly into a conventional (physical) mouse port of a host computer and thus uses the standard mouse driver software integrated in the Windows operating software. Additionally it requires no special or modified controller IC (keyboard or mouse) in the host computer hardware. This makes a true, stand-alone mouse type peripheral.

Description of Standard PC Ports

A typical generic PC with PS/2 mouse and keyboard ports, allows for a separate keyboard and mouse (pointer) to be physically plugged or unplugged from said ports. The signal and power lines required are wired to a separate 6 pin mini-din connector, and for the mouse are as follows: +5V, common, mouse clock, mouse data. Likewise for the keyboard there is another separate 6 pin mini-din connector wired as follows: +5V, common, keyboard clock, keyboard data.

In an alternate space saving configuration, typically in laptop computers, a single 6 pin mini-din connector is used by having the connector wired as follows: +5V, common, keyboard clock, keyboard data, mouse clock, mouse data. In this case, the user needs a cable adaptor in order to plug in both peripherals. The keyboard and mouse communicate to (transmit data) to the host PC over their appropriate clock and data lines following a prescribed protocol. This data does not go directly to the host processor or host processor bus, but is connected to a keyboard/mouse controller IC via the aforementioned clock and data lines and specific protocol, and this controller IC is connected to the host processor bus. This requires a separate microcontroller IC inside both the keyboard and another in the mouse, which are "not" the same but are separate from the keyboard/mouse controller IC resident in the host. This standard design allows a user to plug in various peripherals, keyboard or mouse, and be assured that the operating system will recognize them and operate correctly.

Prior Art Differentiation

The closed prior art is the U.S. Utility Pat. No. 6,100,875 published in the names of Goodman et al in August 2000. Hereafter referred to as Goodman patent or '875 patent and applicant's own invention U.S. Utility Pat. No. 5,376,946 awarded to Peter Mikan on Dec. 27, 1994 for "Computer Mouse Simulator Device"

The Goodman patent requires a specialized keyboard controller IC with specialized firmware residing in the host computer, or alternately, specialized software installed in the host, or a combination thereof. The description and claims are not consistent except that they cannot work as described without some combination of the above. Goodman describes a keyboard implemented "within" a notebook computer (ref. column 3, lines 33-36) and although he alludes to not restricting it as such, all the descriptions, claims and figures can only work in an environment where the keyboard controller or software/firmware are resident in the host, and not the peripheral.

Goodman patent in claim 1 makes clear that the keyboard controller is coupled to both selected keys and to the said host computer, making clear that this is one and the same controller IC which in FIGS. 2 and 3 is also clearly shown to be resident in the host and not the keyboard itself. In particular the signal lines 204 are keyboard key matrix connections not the requisite clock and data lines which would require yet another IC controller in the keyboard. Likewise in claim 2 the mouse pointer emulating apparatus is not resident in the keyboard, but describes either firmware residing either in a modified (customized) keyboard controller IC resident in the host or software that must be installed in the host memory.

Unfortunately, Goodman does clarify which, except that in column 8 lines 45-48 it is clear that the emulation requires special software by explaining how a user could select from an "option list during set-up operations of the computer". This is describing the difficulty should a user install a serial mouse (not PS/2) with the Goodman keyboard described.

It is self evident that the Goodman patent is actually only compatible with laptop style computers (computers with built in keyboards) and not standard PC's with standard external keyboard and mouse ports.

In contrast applicant's invention accomplishes all the mouse functions externally to the host PC by using a dedicated microcontroller IC resident in the keypad peripheral, that communicates with the host via the appropriate clock and data lines using the appropriate PS/2 external protocols and thus is fully compatible with the standard operating system drivers. This obviates the issue described by Goodman above and does not require either modified, (customized) host keyboard controller IC or specialized software. It also allows using other standard keyboards in combination with this mouse keypad Detailed Description of the Circuit The circuit of keypad computer mouse emulation system comprises a microprocessor U1 110, typically an 87C51, and a driver IC U2 140, 150, which in this PS/2 version is a non-inverting open collector buffer, typically an industry standard 7404. For other versions, such as standard serial mouse or USB mouse the driver IC among other components would be different. There is a crystal X1 120, 420 which together with capacitors C5 418 and C6 422 each typically 30 Pico farad provide an 11.0592 Megahertz clock for U1 100, 410. Resistor R-4 414 and capacitor C-2 413 generate the power on reset timing. The status of switches S1 through S6 collectively 111, are monitored by direct connections to U1 input/output (I/O) pins. Capacitors C1, C3, C4 (461, 663 & 464 respectively) are power filter capacitors. The four-pin header HDR4 465 is the termination for the computer mouse cable and brings the +5V and common connections 412 to the circuit, as well as the signal I/O lines labeled data 442 and clock 444.

The resistors R5 445 and R6 446 are pull-ups to +5V 410 for the clock 444 and data 442 lines. LED's L1 through L6 collectively 452 provide the back lighting and are connected in three strings to +5V through current limiting resistors R1, R2 and R3 collectively 451.

The cathodes of L4, L5 and L6 respectively are connected to the three outputs of U2 450, which under microprocessor control can pull the cathodes to common to turn on the LED's. Two other gates of U2 450 are used to buffer the clock 44 and data 442 signals generated by U1 410 before they connect to the output header HDR4 465. The same signals sent by computer mouse port are monitored by U1 110, 410 via direct connection to two I/O pins of U1. In this way the circuit generates the clock signal used in communicating with the computer mouse port as well as reads or sends data bytes on the data line. The firmware that is loaded into the non-volatile memory of U1 110, 410 is described by flow charts 'main program loop' 200 and 'interrupt routine timer1' 300.

FIG. 5, is a graph showing the relationship between how long an arrow key is depressed and how many correspondent cursor movement counts, in pixels, are transmitted per second to the mouse port. This data is also stored in the U1 110, 410 memory, wherein 500 represents cursor rate plot against arrow key depressed time and 510 represents time along X-axis and 520 cursor pixel rate per second along Y-axis. 530 represents rate for one second or less of time, 540 represents rate from 1-4 seconds approx, 545 corresponds to accelerated rate 5-6 seconds and 550 corresponds to rate saturation at 6 seconds.

FIG. 6 is a suggested layout arrangement of the 6 keys of the keypad all of which are further delineated below with reference numerals integrated into the drawings wherein 600 is typical layout of keypad generally complete keypad housing 610, circuit board fasteners to housing 612, water proof molded silicone integrated cover over keys/switches 620, mouse button functionality 630, right mouse button 632, left mouse button 634, arrow keys/switches generally 640, left arrow key or switch 642, down arrow key or switch 644, right arrow key or switch 646, and up arrow key or switch 648.

Assembly and Use Operation

As described previously, the six keys 111, and the associated circuit 100, provide for computer mouse emulation so that at the computer mouse port all signals indicate to the computer as though a standard desktop mouse were plugged into the port. Anytime the user presses an arrow key (642, 644, 646, 648) momentarily, the circuit 100, 400 transmits a complete data packet in standard mouse protocol with a pixel count set to one for the corresponding direction. If the user depresses an arrow key and holds it down, then the circuit continues to transmit data packets as though a pointing device such as a standard mouse were being moved steadily in that direction.

In addition, the pixel count that is transmitted depends on how long the key has been held depressed, with the microprocessor 110, 410 using the curve shown in FIG. 5 500 to calculate the pixels per second data that needs to be transmitted. To move the cursor diagonally, the user depresses the appropriate two arrow keys, i.e. to move the cursor towards the top right direction diagonally one depresses the up 648 and right 646 arrow keys simultaneously. The left 634 and right 632 mouse keys are implemented with separate keys as shown in the drawing. Pressing either one will send a complete mouse data packet to the computer with the appropriate bits set that corresponds to the left or right switch status. A switch key can be held while simultaneously activating arrow keys. The circuit 100, 400 controls the light intensity by pulse width modulation of the LED's 452 so as to achieve ten levels of back lighting, including full on and full off. At power on reset mode the back lighting intensity is set to five. To change the light intensity setting, the user first depresses the left and right arrow keys simultaneously and holds them down for more than one second, this notifies the microprocessor that the next action is light intensity adjustment not cursor data transmissions. Subsequently the user can increment the register that holds the light intensity setting up or down by pressing the up 648 or down 644 arrow keys.

This number can be incremented up to ten or down to zero, if the user continues to press the key after reaching the maximum or zero count the microprocessor does not change the register beyond these limits. A count of zero in the light intensity register provides for all the LED's 452 to be off, and a count of ten sets all LED's 452 full on, with any number in between being a proportional 'on time' verses 'off time' for the pulse width modulation of the LED's 452. When no arrow key is pressed for at least three seconds, the circuit exits the light adjust mode and then responds to key presses in the standard mouse protocol as previously described.

The inventor has given a non-limiting description of this invention. Due to the simplicity and elegance of the design of this invention designing around it is very difficult if not impossible. The concept of mouse emulation keypad disclosed here would be difficult to design around. Nonetheless many changes may be made to this design without deviating from the spirit of this invention. Examples of such contemplated variations include the following:

1. The value and the tolerance of various electronic components may be modified.

2. Instead of the silicone rubber cover a different means may be utilized for making it water proof.

3. A different type of cable may be used.

4. PS/2 computer style mouse interface could be other type such as serial etc.

5. Standard protocols may be modified for specific needs.

6. Additional complimentary and complementary functions and features may be added.

7. A more economical or an upscale version of the device may be adapted.

8. Other changes such as aesthetics and substitution of newer materials as they become available, which substantially perform the same function in substantially the same manner with substantially the same result without deviating from the spirit of the invention may be made.

Following is a listing of the components uses in this embodiment arranged in ascending order of the reference numerals for ready reference of the reader.

100=The mouse emulation keypad generally
110=Microprocessor U1 such as 87C51
111=Keys or Switches S1-S6 and their input interface to the U1 Integrated circuit
112=Logic power supply typically 5 volts positive to common ground
113=Input Output Interface between U1 integrated circuit and the mouse buffer
114=Input Output interface between U1 integrated circuit and the LED buffer
120=Clock frequency control Crystal
130=Power On Reset
140=Mouse buffer
142=Data
144=Clock
150=LED Buffer
152=LED—Light Emitting Diodes
200=Main computer program loop generally
201=Start of main computer program
202=Power on reset
210=Checking step for mouse commands
212=Scanning step for S1 through S6 keys status
216=Decision step for Back Lit status
218=Decision block for light intensity mode
220=Decision block for left/right arrow keys depressed more than momentarily
222=Light Intensity Mode Flag
223=Feedback Loop for light intensity mode flag
224=Decision block for left or right mouse switch status change
225=The process of setting the switch data register per mouse protocol
226=Decision block for Arrow key status
228=The process step for stopping of X-Count and Y-Count timers and clearing the flag which is later used in Timer-1
230=The process of setting the flag and calculating X-Count and Y-Count timers and their concomitant use in the main computer program loop.
234=Mouse Data Feedback loop
235=Process step of transmitting the mouse data, X-count, Y-count to computer mouse
236=Decision block for up or down arrow key/switch status
238=Decision block for up arrow key/switch status
240=Decision block for down arrow key status
242=Decision block for excessive inter key interval (typically greater than 3 seconds)
244=Light intensity increment process
246=Light intensity decrement process
248=Light intensity flag clear process step
250=Light On and Off calculation
254=A (IN)
255=A (OUT)
300=Interrupt Routine Time 1 program loop generally
310=Decision block Arrow on status
311=Decrement X & Y Count R-5 counter/register
312=Decision block for R5 counter status
313=Decision block for right or left arrow flag
314=Increment X-Count register R-4
315=Decision block for up or down arrow flag status
316=Increment Y-Count Register counter R-2
317=Update delay register R-5
318=Feedbackloop
320=Decision block for consecutive interrupts counter
321=Increment Key/Switch clock Counter/Register
322=Decision block for Light ofvon flag status
323=Decision block for light toggle flag status
324=Turning On of LEDs
326=Turning Off of LEDs
328=Feed Forward Loop
330=Return
400=Mouse emulation keypad to computer interface Circuit via mouse port generally
410=Microprocessor
411=Keys and switches S1-S6
412=Logic power supply to microprocessor
413=Capacitor C-2 typically 6.8 micro farad
414=Carbon resistor typically 20 kilo ohms
418=Capacitor C-5 30 Pico farad
420=Clock frequency control crystal
422=Capacitor C-6 30 Pico farad
440=Mouse buffer
442=Data
444=Clock
445=Resistor R-5 typically 2.2 K ohms carbon resistor
446=Resistor R-5 typically 2.2 K ohms carbon resistor
450=LED buffer
451=Resistor R1-R3
452=Light Emitting Diodes L1-L6
460=Option jumpers
461=Capacitor typically 6.8 micro farad
463=Capacitor typically 0.1 micro farad
464=Capacitor typically 0.1 microfarad
465=Connector for power and data and clock lines
470=Switch/Light status
480=Switch/Key Legend
500=Cursor rate plot against arrow key depressed time
510=Time along X-axis
520=Cursor pixel rate per second along Y axis
530=Rate for one second or less of time
540=Rate from 1-4 seconds approx
545=Accelerated rate 5-6 seconds
550=Rate saturation at 6 seconds
600=Typical layout of keypad generally
610=Keypad housing
612=Circuit board fasteners to housing
620=Water proof molded silicone integrated cover over keys/switches
630=Mouse button functionality
632=Right mouse button
634=Left mouse button
640=Arrow keys/switches generally
642=Left arrow key or switch
644=Down arrow key or switch
646=Right arrow key or switch
648=Up arrow key or switch

DEFINITIONS AND ACRONYMS

A great care has been taken to use words with their conventional dictionary definitions. Following definitions are included here for clarification.

3D=Three Dimensional
C=Capacitor
DIY=Do It Yourself
Integrated=Combination of two entities to act like one
Interface=Junction between two dissimilar entities
Keypad=A data entry device from an operator(s) to computer(s)
LED=Light Emitting Diode Mouse=A pointing device used with computers
PC=Personal Computer (Standard IBM Compatible)
Pixel=Smallest/finest resolution increment on a computer display.
R=Resistor
RTS=Request to send
SPST=Single pole single throw switch
Proportional=Ideal ratio under the design rules and circumstances.
Symmetrical=The shape of an object of integrated entity which can be divided into two along some axis through the object or the integrated entity such that the two halves form mirror image of each other.
U=Integrated Circuit such as a microprocessor or driver
X=Crystal While this invention has been described with reference to illustrative embodiments, this description is not intended to be construed in a limiting sense. Various modifications and combinations of the illustrative embodiments as well as other embodiments of the invention will be apparent to a person of average skill in the art upon reference to this description. It is therefore contemplated that the appended claim(s) cover any such modifications, embodiments as fall within the true scope of this invention.

The inventor claims:

1. A process of emulating a pointing device through a microprocessor with embedded firmware keypad for pointing device data entry into a standard personal computer comprising the steps of:
   a) assembling a microprocessor with embedded firmware keypad comprising at least four back lit arrow keys bearing the legend left, right, up and down symbolically and two back lit keys firmware programmed to emulate left and right buttons of a pointing device and bearing the legend of left and right mouse buttons symbolically of said pointing device;
   b) emulating a pointing device through said microprocessor with embedded firmware keypad; and wherein
   c) said emulation is in part accomplished through firmware programmed into said keypad comprising programmed microprocessor with embedded firmware wherein said firmware program comprises a power on reset, a subroutine program to control back lit lighting, a subroutine program to control cursor rate, a subroutine program to emulate left right mouse functions; and a plurality of decision blocks to check status of arrow keys.

* * * * *